(12) United States Patent
Fuse

(10) Patent No.: US 10,482,219 B2
(45) Date of Patent: Nov. 19, 2019

(54) LICENSE MANAGEMENT SERVER, LICENSE MANAGEMENT SYSTEM, AND STORAGE MEDIUM

(71) Applicant: CANON KABUSHIKI KAISHA, Tokyo (JP)

(72) Inventor: Hiroshi Fuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 15/415,218

(22) Filed: Jan. 25, 2017

(65) Prior Publication Data

US 2017/0220778 A1  Aug. 3, 2017

(30) Foreign Application Priority Data

Jan. 29, 2016 (JP) ................. 2016-016369

(51) Int. Cl.
| | |
|---|---|
| *H04L 29/06* | (2006.01) |
| *G06F 21/10* | (2013.01) |
| *G06F 8/71* | (2018.01) |

(52) U.S. Cl.
CPC .............. *G06F 21/105* (2013.01); *G06F 8/71* (2013.01); *G06F 21/10* (2013.01); *G06F 2221/0768* (2013.01)

(58) Field of Classification Search
None
See application file for complete search history.

(56) References Cited

U.S. PATENT DOCUMENTS

| | | | |
|---|---|---|---|
| 8,224,750 B1* | 7/2012 | Bennett | G06F 21/10 705/51 |
| 2002/0194010 A1* | 12/2002 | Bergler | G06Q 10/10 705/310 |
| 2003/0084306 A1* | 5/2003 | Abburi | G06F 21/10 713/188 |
| 2003/0172035 A1* | 9/2003 | Cronce | G06Q 30/06 705/59 |
| 2004/0181787 A1 | 9/2004 | Wickham | |
| 2004/0249756 A1 | 12/2004 | Garibay | |
| 2007/0299845 A1 | 12/2007 | Tokunaga | |
| 2008/0098216 A1* | 4/2008 | Scovetta | H04N 7/162 713/165 |
| 2008/0222044 A1* | 9/2008 | Gottlieb | G06F 21/10 705/59 |
| 2011/0197077 A1* | 8/2011 | Chan | G06F 21/10 713/189 |

(Continued)

FOREIGN PATENT DOCUMENTS

JP  2015-014817 A  1/2015

*Primary Examiner* — Shin-Hon (Eric) Chen
(74) *Attorney, Agent, or Firm* — Canon U.S.A., Inc., IP Divison

(57) ABSTRACT

When a license management server according to the present exemplary embodiment receives a request for changing a license of a first version to a license of a second version from a license operation server that leases a license to a client, the license management server changes an expiration date of the license of the first version to a predetermined period of time later, and issues the license of the second version. Then, the license of the first version of which expiration date has been changed to the predetermined period of time later and the issued license of the second version are transmitted to the license operation server.

13 Claims, 9 Drawing Sheets

(56) References Cited

U.S. PATENT DOCUMENTS

2012/0253959 A1* 10/2012 Li ..................... G06F 21/105
                                                    705/26.1
2016/0379292 A1* 12/2016 Mowatt ................ G06F 8/60
                                                    705/26.7

* cited by examiner

FIG.5

| 501 | 502 | 503 | 504 | 505 | 506 | 507 | 508 | 509 |
|---|---|---|---|---|---|---|---|---|
| SERIAL NUMBER | SOFTWARE NAME | SOFTWARE VERSION | SOFTWARE IDENTIFICATION INFORMATION | QUANTITY | EXPIRATION DATE | DEVICE INFORMATION | REMAINING NUMBER | BORROWER |
| 1111-1111-1111-1111 | SOFTWARE A | 1 | C100 | 5 | INDEFINITE | 0000AAAA2222 | 5 | |
| 2222-2222-2222-2222 | SOFTWARE A | 2 | C200 | 10 | 2015/12/31 | 0000AAAA2222 | 10 | |
| 2222-2222-2222-2222 | SOFTWARE A | 3 | C300 | 10 | INDEFINITE | 0000AAAA2222 | 10 | |

| SERIAL NUMBER | SOFTWARE NAME | SOFTWARE VERSION | SOFTWARE IDENTIFICATION INFORMATION | QUANTITY | EXPIRATION DATE | DEVICE INFORMATION |
|---|---|---|---|---|---|---|
| 1111-1111-1111-1111 | SOFTWARE A | 1 | C100 | 5 | INDEFINITE | 0000AAAA2222 |
| 1111-1111-1111-AAAA | SOFTWARE A | 1 | C100 | 3 | INDEFINITE | |
| 2222-2222-2222-BBBB | SOFTWARE A | 2 | C200 | 20 | INDEFINITE | |
| 2222-2222-2222-2222 | SOFTWARE A | 2 | C200 | 10 | 2015/12/31 | 0000AAAA2222 |
| 2222-2222-2222-2222 | SOFTWARE A | 3 | C300 | 10 | INDEFINITE | 0000AAAA2222 |
| 3333-3333-3333-CCCC | SOFTWARE A | 3 | C300 | 10 | INDEFINITE | |

601  602  603  604  605  606  607

600

LICENSE MANAGEMENT SERVER, LICENSE MANAGEMENT SYSTEM, AND STORAGE MEDIUM

BACKGROUND OF THE INVENTION

Field of the Invention

The present invention relates to a license management.

Description of the Related Art

Methods for giving licenses for commercial software include a node-locked method and a floating method. In the node-locked method, a computer of a user directly obtains a license from a license server, so that the computer is associated with the license, and accordingly, the computer that has obtained the license can use the software. The license associated with the computer is configured not to be allowed to be used by computers other than the computer that has obtained the license.

On the other hand, the floating method is a method in which a license server pooling a certain number of licenses in advance leases a license to a client. A license (floating license) managed by the floating method is returned back to the license server when each client terminates the use of the corresponding software. Therefore, another client thereafter borrows the returned license, so that the same software can be used on the another client. The number of licenses that can be leased to multiple clients at a time is limited by the number of licenses (certain number of licenses) pooled in the license server. However, a license is borrowed only when the software is used, and therefore, if multiple clients use the software at different points in time, the software can be used on a number of clients which are the number of pooled licenses or larger. In general, only some of the employees such as a system administrator of a company which purchased the software perform management of licenses according to the floating method.

A relationship between a license and a version of software will be described. FIG. 10 of Japanese Patent Application Laid-Open No. 2015-014817 indicates that an application identification (ID) and latest version information are associated with each other and registered to a license server, and when a start request is received from a personal computer (PC), a guidance of version update is given in a case where the software in the PC is an older version. However, in Japanese Patent Application Laid-Open No. 2015-014817, only the guidance of the version update is given, and it is up to a user's operation on each client PC whether the version of the software is actually updated. Further, in Japanese Patent Application. Laid-Open No. 2015-014817, the number of PCs that can start software at a time is managed in association with the application ID. In other words, in Japanese Patent Application Laid-Open No. 2015-014817, for software having the same application ID, a common floating license is used even with different versions. More specifically, software of an obsolete version can be used even if the user of each client PC does not update the version of the software, and therefore, some users may not perform upgrade work of the software.

On the other hand, from the perspective of operations and maintenance of software, a system administrator of a company which purchased software wishes to unify the versions of the software used by the clients into a single version. However, the technique described in Japanese Patent Application Laid-Open No. 2015-014817 relies on whether the user of each client PC performs the upgrade work of the software, and therefore, it may be impossible to make the software of each client PC into a single version.

For this reason, it is considered to introduce the version to the license according to the version of the software. More specifically, it is considered to allow software to be started only in a case where the version of the license and the version of the software match each other. When the system administrator upgrades the version of the license managed by the license server, the version of the software that can be started on each client can be limited.

However, in a case where the software is allowed to be started only in a case where the version of the license and the version of the software match each other, and the system administrator updates the version of the license managed by the license server, the following matters will occur. When the system administrator upgrades the license of the license server before the client upgrades the software, a license of an older version required for the software of the old version is erased from the license server even though a client is starting the software of the older version, and therefore, the software that is in the process of starting will not operate. In other words, when the license managed by the license server is replaced with a license of a new version, this is disadvantageous for the client that is using the software of the older version.

For example, suppose that there is an environment in which the client operates software of version 2, and the license server holds the license of version 2. Then, in a case where the system administrator upgrades the license existing in the license server from version 2 to version 3, the license of version 2 required for starting of the client is erased from the license server. Therefore, the software of version 2 cannot be started on the client. In other words, when the license managed by the license server is replaced with a license of a new version, this is disadvantageous for the client that is using the software of the old version.

SUMMARY OF THE INVENTION

According to an exemplary embodiment of the present invention, a license management server includes a reception unit configured to receive from a license operation server that leases a license to a client, a request for changing a license of a first version to a license of a second version, a change unit configured to change an expiration date of the license of the first version to a predetermined period of time later in a case where the reception unit receives the request, an issuing unit configured to issue the license of the second version in a case where the reception unit receives the request, and a transmission unit configured to transmit, to the license operation server, the license of the first version of which expiration date has been changed by the change unit to the predetermined period of time later and the license of the second version issued by the issuing unit.

Further features of the present invention will become apparent from the following description of exemplary embodiments with reference to the attached drawings.

BRIEF DESCRIPTION OF THE DRAWINGS

FIG. 5 is a license table saved by a license saving unit.

FIG. 6 is a license table held by a license management unit.

DESCRIPTION OF THE EMBODIMENTS

Figure 1:
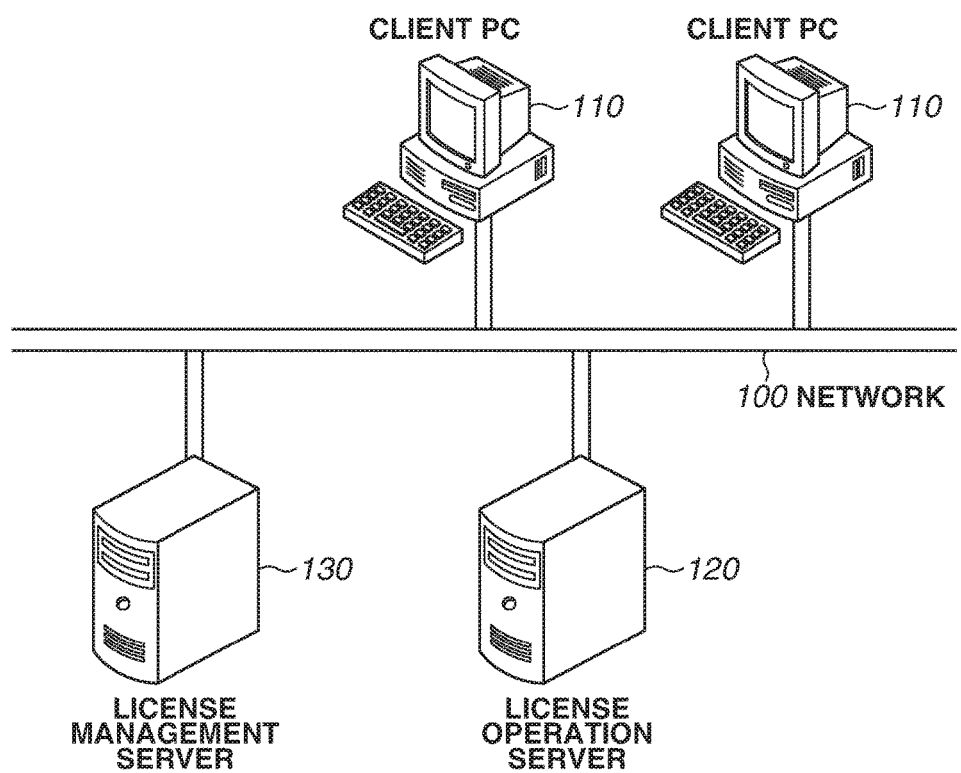
FIG. 1 is an example of a configuration of a system.

FIG. 1 is a figure illustrating a configuration of a license management system according to a first exemplary embodiment of the present invention. The present exemplary embodiment is a system in which a client 110, a license operation server 120, and a license management server 130 described below can communicate with each other via a network 100 (for example, local area network (LAN)). The network is not limited to a LAN, and may be other networks.

Each client 110 is a computer requesting the license operation server 120 for a license, and is operated by a user. The license operation server 120 is a computer managing a license of a floating method that has been purchased, and is, for example, a local server operating within a company which has purchased the software. The license operation server 120 is a server managed by the system administrator of the company which has purchased the software. When the client 110 uses software 300 illustrated in FIG. 3 installed on the client, the client 110 requests the license operation server 120 for the license, and in a case where the client 110 successfully borrows the license from the license operation server 120, the client 110 makes the software 300 into a usable state. It should be noted that the license is information (permission information) required to use the software 300.

The license management server 130 is a computer issuing a license to a company which has purchased software, and invalidating the issued license. For example, the license management server 120 is operated by a sales company selling software and a developing company of software.

Figure 2:
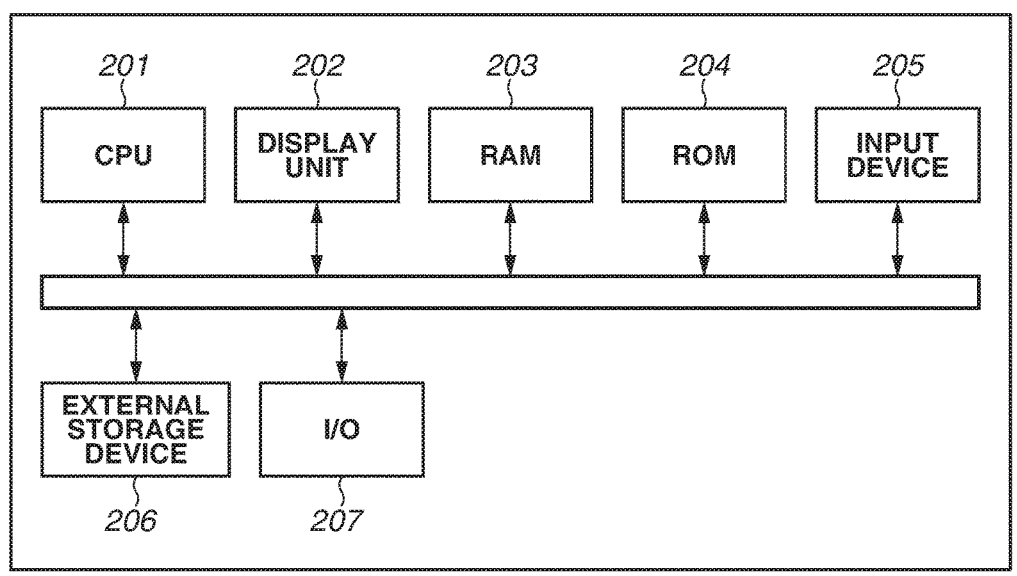
FIG. 2 is an example of a configuration of hardware of each computer.

FIG. 2 is a figure illustrating an example of a configuration of hardware of each computer (the client 110, the license operation server 120, and the license management server 130).

In FIG. 2, an input device 205 for receiving a user operation input such as a keyboard and a pointing device is provided. Further, a display unit (display) 202 for giving visual output information feed back to the user is provided. Furthermore, a random access memory (RAM) 203, a read only memory (ROM) 204, and an external storage device 206 such as a hard disk drive (HDD), a digital versatile disk (DVD)-ROM drive (disk drive) and a removable memory are provided as a storage device for holding execution information and various kinds of programs for causing a computer (central processing unit (CPU) 201) to execute each processing described below. An input-output (I/O) 207 is an interface device for performing communication with an external device. The client 110, the license operation server 120, and the license management server 130 communicate with each other via the interface device I/O 207.

The processing described in the present exemplary embodiment is realized by loading a program (a program for a client or a program for each server) saved in the ROM 204 or the external storage device 206 to the RAM 203 and causing the CPU 201 to execute the program.

Figure 3:
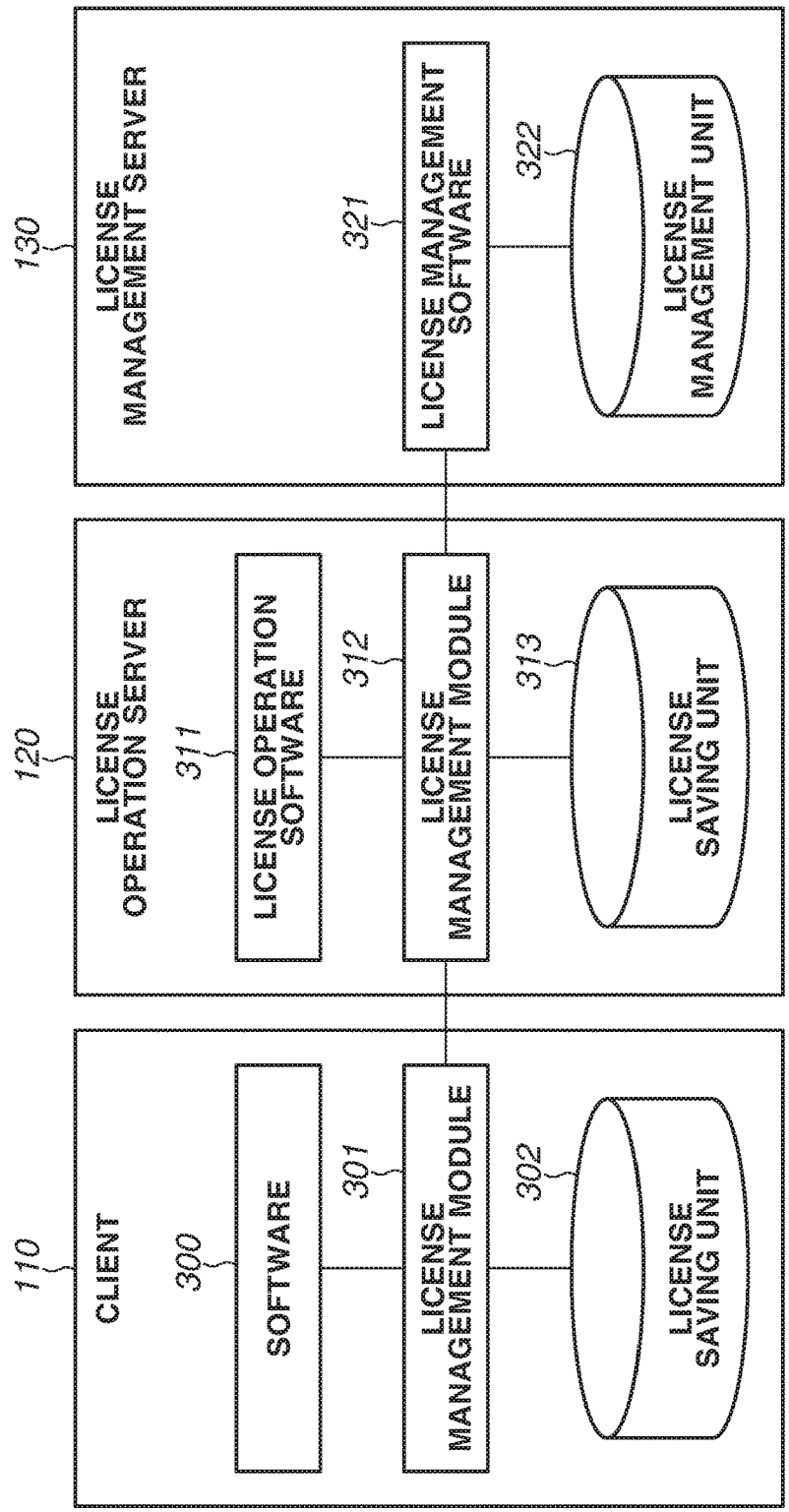
FIG. 3 is an example of a configuration of software of each computer.

FIG. 3 is a figure illustrating an example of program configuration executed by the client 110, the license operation server 120, and the license management server 130.

The client 110 includes software 300, a license management module 301, and a license saving unit 302. The software 300 is any given software, for example, word processor software, spreadsheet software, database software, image editing software, and editor software. The software 300 can be used only when the client obtains the license.

The license management module 301 of the client includes functions for processing in general with regard to licenses in the client 110. The license management module 301 is a program for requesting the license operation server 120 for license information (particular information) required when the software 300 is used, and thus obtaining the license information. The CPU of the client 110 functions as usage management means for performing license management for using the software 300 by executing the license management module. The license management module 301 receives a request from the software 300 which is to be executed, generates request data for license processing, and adds information required for obtaining the license to the request data. The information required for obtaining the license is, for example, identification information about the software 300 and device information about the client 110. The device information corresponds to information for uniquely identifying the computer of the client. For example, the device information corresponds to a media access control (MAC) address. After the information is added to the request data for obtaining the license, the request data is transmitted to the license operation server 120. Further, the license management module 301 receives the license leased from the license operation server 120, and saves the received license to the license saving unit 302.

The license saving unit 302 of the client is a database for saving information about the license obtained from the license operation server 120. The license saving unit 302 also manages information which is to be associated with the license. For example, the name of the software, the version of the software, the identification information about the software, and the device information about the client are saved in association with the license. The above information is used to determine whether the software 300 can be started. When the use of the software 300 is terminated, and the license management module 301 returns the license back to the license operation server 120, the license management module 301 erases from the license saving unit 302 the information associated with the returned license.

The license operation server 120 includes license operation software 311, a license management module 312, and a license saving unit 313.

Figure 4:
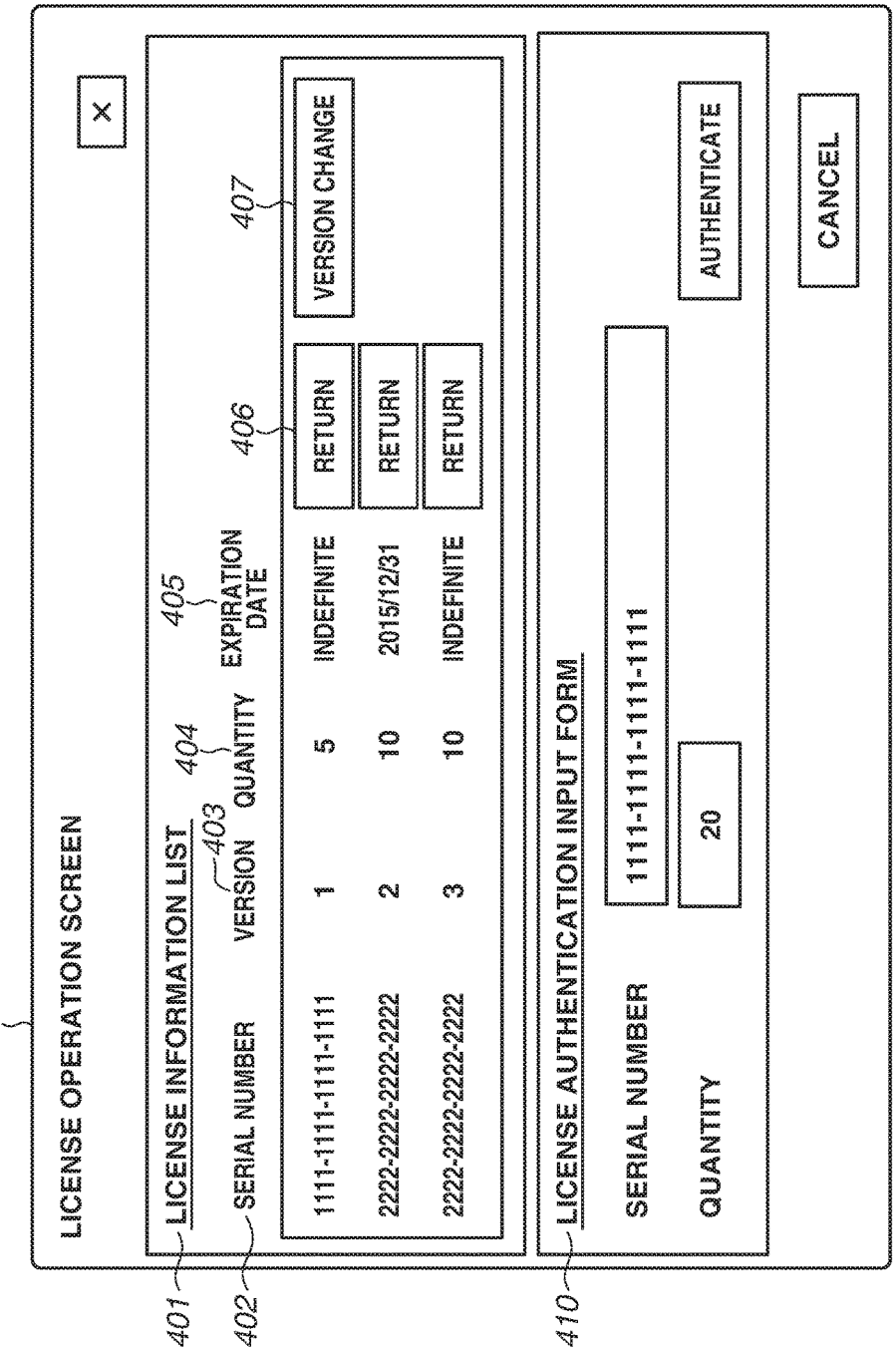
FIG. 4 is a user interface (UI) screen of license operation software.

The license operation software 311 is, for example, a program for displaying a list of purchased license information held by the license operation server 120, and displaying a license operation screen, and the like in FIG. 4 for receiving an input of license authentication, return, version change, and the like. As a tool for managing the license operation of the software 300, the system administrator of the company which purchased the software 300 installs the license operation software 311 to the license operation server. The license operation software 311 corresponds to the version of the purchased software 300, and is considered to hold information about the version of the purchased software within the license operation software 311. In a case where the version of the software 300 is upgraded for free or pay, the system administrator is considered to install the license operation software 311 corresponding to be upgraded version.

The license management module 312 of the license operation server includes functions for processing in general with regard to licenses in the license operation server 120. When the company purchases the license of the software 300, the CPU of the license operation server executes the license management module 312 to request the license management server 130 for license information (particular information) required for using the software 300 and obtains the license information. Then, the license management module 312 of the license operation server 120 accumulates the license information obtained from the license management server 130 to the license saving unit 313. The license management module 312 functions as usage management means for performing usage management of the license operation software 311 based on the accumulated license information.

The license management module 312 receives a request from the license operation software 311 which is to be executed, and the license management module 12 generates request data for license authentication, and adds information required for the license authentication to the request data. The information required for the license authentication is, for example, information such as identification information about the license operation software 311, device information about the license operation server 120, identification information about the software, a serial number, and the number of licenses. The device information is information for uniquely identifying the license operation server 120, and the device information corresponds to, for example, a MAC address. The identification information about the software is information for uniquely identifying the purchased software name and the version thereof. The serial number is unique number given to a package of the software purchased by the company, and a number required to request the license management server to issue a license. The number of licenses is a total number of licenses for which license management software 321 described below is requested, and the licenses as many as this number can be obtained and pooled. After the above information is added to the request data for the license authentication, the request data is transmitted to the license management server 130. The license management module 312 receives the license issued by the license management server 130, and saves the received license to the license saving unit 313. In the present exemplary embodiment, the serial number is considered to be described on the package of the software purchased by the company, but the serial number is not limited thereto. In a case where the software downloaded and purchased via a network, the serial number may be a number notified during download.

The license saving unit 313 is a database (license table, the details of which will be described in FIG. 5) for saving information about the license obtained from the license management software 321. The license saving unit 313 also manages information to be associated with the license. For example, the information corresponds to the name of the software, the version of the software, the identification information about the software, device information about the license operation server 120, the serial number, the number of licenses, and an expiration date of the license. The information is used for license obtaining processing with the software 300, license version change processing on license operation screen in FIG. 4. In a case where the license is returned to the license management module 130, the license management module 312 erases from the license saving unit 313 the information associated with the returned license.

The license management server 130 includes the license management software 321 and a license management unit 322.

The license management software 321 of the license management server 130 has a total function for the license management. The license management software 321 transmits and receives information about the license to and from the license operation server 120. The license management software 321 executes an issue of a license, a change of an authentication state of a license, and the like based on a request (request data) received from the license operation server 120. In other words, the CPU of the license management server 130 functions as license management means for performing management of a license by executing the license management software. The license management software 321 transmits the issued license to the license operation server 120.

The license management unit 322 is a database (license table, the details of which will be described below in FIG. 6) for saving information about licenses managed by the license management software 321. The license management unit 322 manages not only information similar to that of the license saving unit 313 but also an authentication state of a license. When the license is authenticated or the license is returned by the license management software 321, the license information managed by the license management unit 322 is updated. In a case where license information is updated based on license authentication, information included in request data associated with the license. The update of the license information based on the license authentication is to accumulate the license information about the license operation software 311, which is to be licensed, in the license operation server 120. On the other hand, in a case where license information is updated based on license return, information associated with the license is erased. In the update of the license information based on the license return, information about the device information about the license operation server 120 and the serial number associated with the license are canceled. When the device information is canceled, the license authentication can be performed on another computer (another license operation server) by using the serial number associated with the returned license.

In the present exemplary embodiment, the license operation server 120 and the license management server 130 are executed on different devices in the explanation. But the present exemplary embodiment is not limited thereto. The license operation server 120 and the license management server 130 may also be executed on the same device.

FIG. 4 illustrates an example of a graphical user interface (GUI) displayed by the license operation software 311. A license operation screen 400 includes a license information list 401 for displaying a list of license information operating on the license operation server, and a license authentication input form 410 for authenticating a license.

The license information list 401 displays a serial number 402, a version 403, a quantity (the number of licenses) 404, and an expiration date 405 of a license saved in the license saving unit 313, and the license information list 401 displays multiple licenses as a list. Each license includes a license return button 406 via which a command to return the license back to the license management server 130 is given, and a version change button 407 via which a command to change the version of the license is given. A license version change means upgrade (or downgrade) of a license. Which of an upgrade and a downgrade is to be carried out on a license is determined by comparing a license version 403 displayed on the license information list 401 and a version held internally in the license operation software 311. More specifically, when the version of the license operation software 311 is more than the version 403 of the license saved in the license saving unit, the license is upgraded. On the other hand, when the version of the license operation software is less than the version 403 of the license saved in the license saving unit, the license is downgraded. When the version of the license operation software is the same as the version 403 of the license, the version change button 407 is not displayed.

FIG. 4 illustrates an example of a case where the version of the license operation software 311 is "3". In FIG. 4, the version of the serial number "1111-1111-1111-1111" is "1", and accordingly, the version change button 407 for upgrade is displayed for the license having the serial number. As described below, for the license having the serial number "2222-2222-2222-2222", a state after the upgrade processing is performed is shown. Since a version "3" after the upgrade exists, a version chance button is not displayed. Among the licenses having the serial number "2222-2222-2222-2222", the obsolete version "2" before the upgrade has an expiration date changed to 30 days later (after a predetermined period of time) as a result of processing described below. The determination as whether the version change button is displayed may be performed for only a serial number having a setting of an expiration date "indefinite".

The license authentication input form 410 is a form where a serial number with which a purchased license is authenticated and quantity (the number of licenses) are to be input, in a case where the license is additionally purchased. When the authentication button is pressed down after the additionally purchased serial number and the quantity have been input, a command is given to the license management server 130 to perform license authentication of the serial number that has been input.

FIG. 5 illustrates an example of a license table saved in the license saving unit 313. A license table 500 manages the information associated with the license obtained by the license management module 312.

A serial number 501 is designated by the license authentication form 410 of the license operation software 311, and the serial number 501 is a serial number that has been successfully license-authenticated. The example of FIG. 5 illustrates a state in which three licenses are saved in the license saving unit 313.

A software name 502 indicates a name of software for which license processing corresponding to each serial number is to be performed. A software version 503 indicates a version of each piece of software. An identification information 504 about the software is information capable of uniquely identifying the software name and which version it is. The identification information 504 is used to determine for which version of the software the license is requested from the client. For example, when the client 110 starts the software 300, the client 110 requests the license operation server 120 for the license. At this occasion, the license management module 301 of the client 110 transmits, to the license operation server 120, the identification information and the version of the software incorporated into the software 300, and the device information about the client. The license management module 312 or the license operation server 120 determines, based the above information, as to whether there is any license that is held in license saving unit 313 and that can be leased. If there is a license that can be leased, the license management module 312 of the license operation server 120 transmits the license to the client 110. In a case where the license management module 301 of the client 110 receives the license, the license management module 301 of the client 110 saves the license to the license saving unit 302. Then, when there exist the software identification information and the device information about the client in the leased license information, the license management module 301 of the client 110 starts the software 300.

A quantity 505 is the total number of purchased licenses (i.e., the total number of licenses that can be leased from the license operation server 120 to the client 110). For example, in a case where the quantity 505 of the license is "5", up to five clients can use the software at a time. A renaming number 508 indicates the number of licenses that can be leased to clients at that point in time. A borrower (lease destination) 509 stores device information about clients to which the license is leased at that point in time. For example, when the license having the serial number of which quantity 505 of the license "5" is leased to three clients, the remaining number is "2". In a case where the remaining number 508 of the license is "0" when a license request is received from a client, the client cannot obtain any license and cannot use the software.

An expiration date 506 is an expiration date of the license. In a case where the expiration date has passed, the version of the software corresponding to the license can no longer be used.

A device information 507 is device information about the license operation server 120. In FIG. 5, the MAC address of the license operation server 120 is used as the device information 507.

In the present exemplary embodiment, the items 501 to 509 are shown as an example of a configuration of the license table 500, but the present exemplary embodiment is not limited to these items.

FIG. 6 illustrates an example of a license table saved in the license management unit 322. A license table 600 manages by which license operation server the license issued by the license management software 321 is used.

Reference numerals 601 to 607 in FIG. 6 correspond to the reference numerals 501 to 507 in FIG. 5, respectively, so that the detailed explanation about each item is not given.

A device information 607 is for identifying by which license operation server the license of each serial number is operated. This device information is saved when the license operation server 120 obtains a license from the license management server 130, and is deleted when the license is returned. More specifically, in a case where the device information 607 is saved, a serial number 601 associated with this information is in a used state so that it cannot be used by another license operation server. On the other hand, in a case where the device information 607 is not saved, the serial number 601 associated with this information is in a non-used state so that it can be used by another license operation server. In the present exemplary embodiment, a single piece of device information 607 is associated and managed with a single serial number, but in a case where a number of licenses 605 can be divided into two or more license operation servers, multiple pieces of device information may be associated and managed.

In the present exemplary embodiment, as a configuration of the license table 600, the reference numerals 601 to 607 are shown as examples of items, but the configuration of the license table is not limited to the above items.

Figure 7:
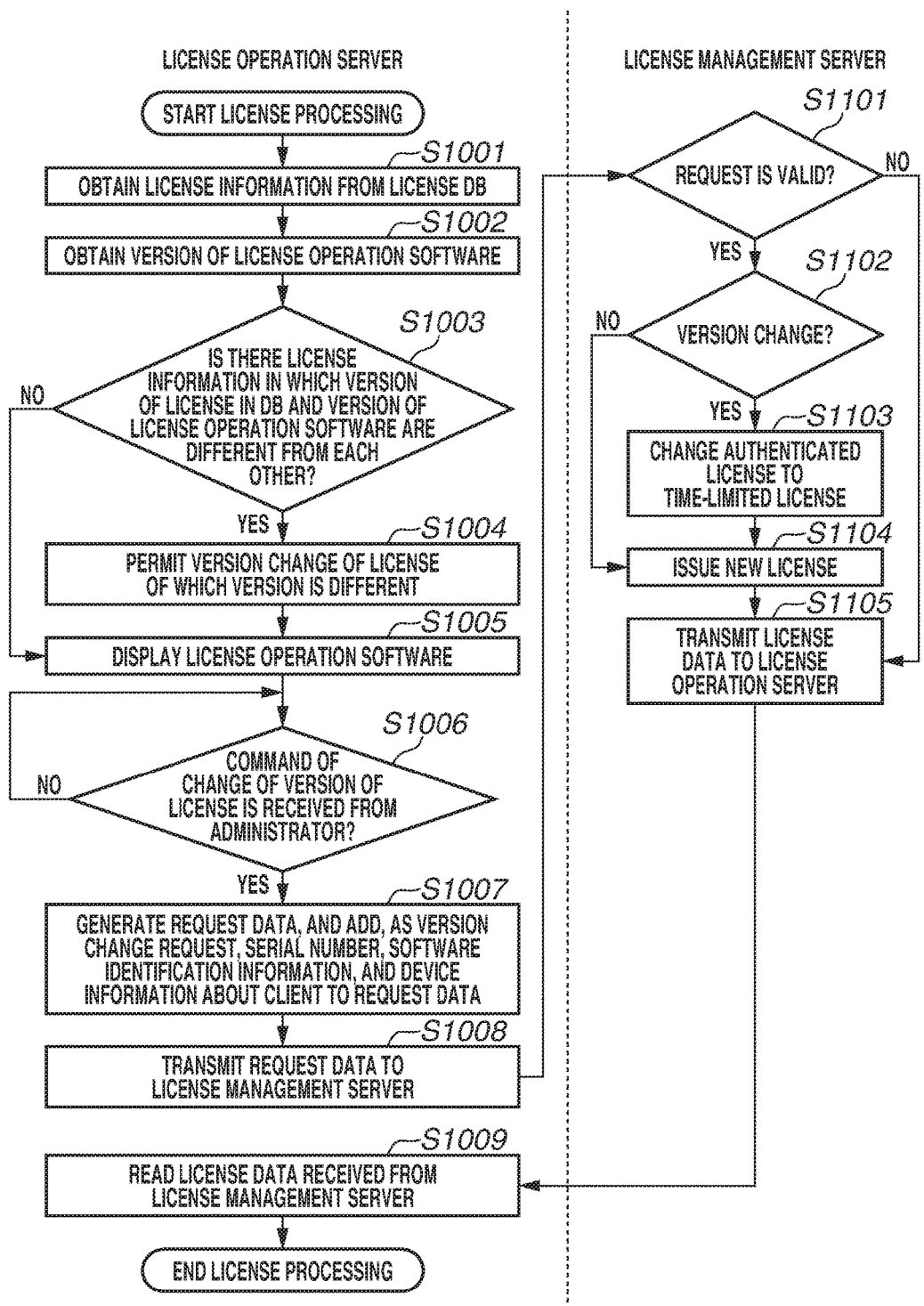
FIG. 7 is a processing flowchart of a first exemplary embodiment.

FIG. 7 is a flowchart of processing executed by the license operation server 120 and the license management server 130. FIG. 7 illustrates a processing procedure in a case where a version of a license is changed (upgraded or downgraded) with the license operation software 311 of the license operation server 120. In a case where the version of the license is upgraded, first, the system administrator installs to the license operation server the license operation software 311 corresponding to the upgraded version in an overwriting manner, and starts the license operation software 311. Hereinafter described is processing that is performed in a case where starting processing of the newly installed license operation software 311 is commanded while a license before the version change is still held in the license operation server 120.

When the start processing of the license operation software 311 is started, in step S1001, the license management module 312 obtains a list of license information from the license saving unit 313.

In step S1002, the license management module 312 obtains the version (software version information about purchased software) internally held by the license operation software 311.

In step S1003, the license management module 312 determines whether there is any license information in which the version of the license information obtained in step S1001 and the version of the license operation software 311 obtained in step S1002 are different from each other. If there is license information in which versions are different (Yes in step S1003), the processing proceeds to step S1004. If there is no license information in which versions are different (No in step S1003), the processing proceeds to step S1005.

In step S1004, the license management module 312 adds flag for permitting a license version change for license information of which version is determined to be different in step S1003.

In step S1005, the license operation software 311 displays a license operation screen such as the one illustrated in FIG. 4. Now, in the license information list 401 of the license operation screen, the version change button 407 is controlled to be displayed for only the license information to which a flag is given in step S1004. In other words, the license information of which version is determined to be different in step S1003 is in a state for which a command for the license version change can be given.

In step S1006, the license operation software 311 determines whether the version change button 407 is pressed. In a case where the version change button 407 is pressed (Yes in step S1006), the processing proceeds to step S1007, case where the version change button 407 is not pressed (No in step S1006), the processing is kept waiting in step S1006.

In step S1007, the license management module 312 generates request data for license processing according to reception of a license version change command from the license operation software 311. Then, the serial number of the license for which the version charge is commanded, the identification information about the software, the quantity of the license, the device information about the license operation server 120, and the like are added to the generated request data as a request for license processing.

In step S1008, the license management module 312 transmits the request data generated in step S1007 to the license management server 130.

Subsequently, the processing in the license management server 130 will be described.

In step S1101, the license management software 321 determines whether the received request data is valid. More specifically, first, the license management software 321 extracts information included in the request data, and compares the information with information in the license table 600. Then, a determination is made as to whether the serial number 601, the identification information 604 about the software, the quantity 605 of the license, and the device information about the license operation server 120 are valid values. When the request data is valid, the information included in the request data should also exist in the license table 600. Then, when all the pieces of request data are valid values, the request data is determined to be valid. If the request data is determined to be valid (Yes in step S1101), the processing proceeds to step S1102, while the request data is determined to be invalid) (No in step S1101), the processing proceeds to step S1105.

In step S1102, the license management software 321 determines whether the received request data is a version change. In a case where the request data is version change request (Yes in step S1102), the processing proceeds to step S1103. In a case where the request data is not a version change request but a new registration request (No in step S1102), the processing proceeds to step S1104. In the case of the version change request, the received serial number is registered to the license table 600 in the already authenticated state as a license for the software of the obsolete version in the license management server 130.

In step S1103, the license management software 321 changes, to a time-limited license, the license for the software of the obsolete version that has been authenticated for the received serial number, and updates the license table 600 accordingly. For example, the expiration date of the license for the software of the obsolete version for the serial number is set to 30 days after the date on which the version change request was received (after a predetermined period of time). By doing so, the license for the obsolete version before the change can be used for 30 days without limitation. The example of FIG. 6 illustrates a state in which, for the serial number "2222-2222-2222-2222", the expiration date for the version of the software operating before the version change request has been changed to "2015/12/31".

In step S1104, the license management software 321 issues a license for software of a new version based on the serial number included in the received request data. The device information about the license operation server 120 is associated with the license, and the license table 600 is updated. For example, if the identification information of the software of the new version included in the request data is C300, the license for the software version "3" is newly issued. In this case, the expiration date of the newly issued license is indefinite. The example of FIG. 6 illustrates a state in which, for the serial number "2222-2222-2222-2222", a license of which expiration date is an indefinite state is issued to the software having the version "3" after the upgrade.

As described above, as a result of the processing from step S1103 to step S1104, on the license table 600, two licenses are associated and managed with a single serial number operating on the license operation server 120. The two licenses include a license for the not-yet updated version and a license for the updated version. The license of the not-yet updated version is configured with a 30-day expiration date, and the license of the updated version is configured as an indefinite license.

In step S1105, the license management software 321 transmits all the licenses associated with the device information about the license operation server 120 in the license tale 600 to the license operation server 120 as license data.

In step S1109, the license management module 312 of the license operation server 120 overwrites and saves (updates) the received license data in the license saving unit 313. As a result, as illustrated in FIG. 5, for the serial number "2222-2222-2222-2222", the expiration date for the version of the software operating before the version change request is "2015/12/31". For the serial number "2222-2222-2222-2222", the license of which expiration date is the indefinite state is saved for the software of the version "3" after the upgrade.

As described above, even if the license upgraded in the license operation server 120, the license for the version before the upgrade will not be immediately erased. Therefore, even if the user of the client PC 110 does not immediately update the version of the software of the client PC, the user of the client PC 110 can continue to use the software of the obsolete version within the expiration date of the license. On the other hand, since expiration date is attached to the license of obsolete version, the user of the client PC 110 cannot indefinitely continue to use the software of the obsolete version.

Therefore, a grace period for upgrading the software can be given to the user of the client PC 110. After the grace period has elapsed, the version of the software used by the floating license can be limited to a single version. Therefore, it would be easy for the system administrator to operate and maintain the software.

In the above first exemplary embodiment, two licenses of which versions are different are temporarily provided to a single serial number as a grace period for changing the version of the software.

However, when upgrade and downgrade of a license are intentionally repeated in a short period of time, for example, when downgrade is performed on an upgraded software and thereafter upgrade is performed again, then, multiple licenses having expiration dates are generated.

For example, when the license for the version 1 is first upgraded, the license of the version 1 is changed to a license having an expiration date, and an indefinite license of the version 2 is newly generated and saved in the license saving unit 313. When the indefinite license of the version 2 is downgraded immediately after that, the license of the version 2 is changed to a license having an expiration date, and an indefinite license of the version 1 is newly generated and saved in the license saving unit 313. At this point in time, the license having the expiration date for the version 1 that was saved in the first upgrade, the license having the expiration date for the version 2 saved during the downgrade, and the indefinite license of the version 1 saved during the downgrade are saved. Then, after that, the second upgrade is further performed on the indefinite license of the version 1, the license of the version 1 is changed to a license having an expiration date, and an indefinite license of the version 2 is newly generated and saved in the license saving unit 313. As described above, when upgrades and downgrades are repeated in a short period of time, multiple licenses having expiration dates are generated.

Therefore, in this second exemplary embodiment, described is a method including the first exemplary embodiment and not increasing a license having an expiration date even if license version changes are repeated multiple times. In the present exemplary embodiment, explanations similar to those of the first exemplary embodiment, e.g., the system configuration and the UI of the application, will not be described again.

Figures 8, 8A, 8B:
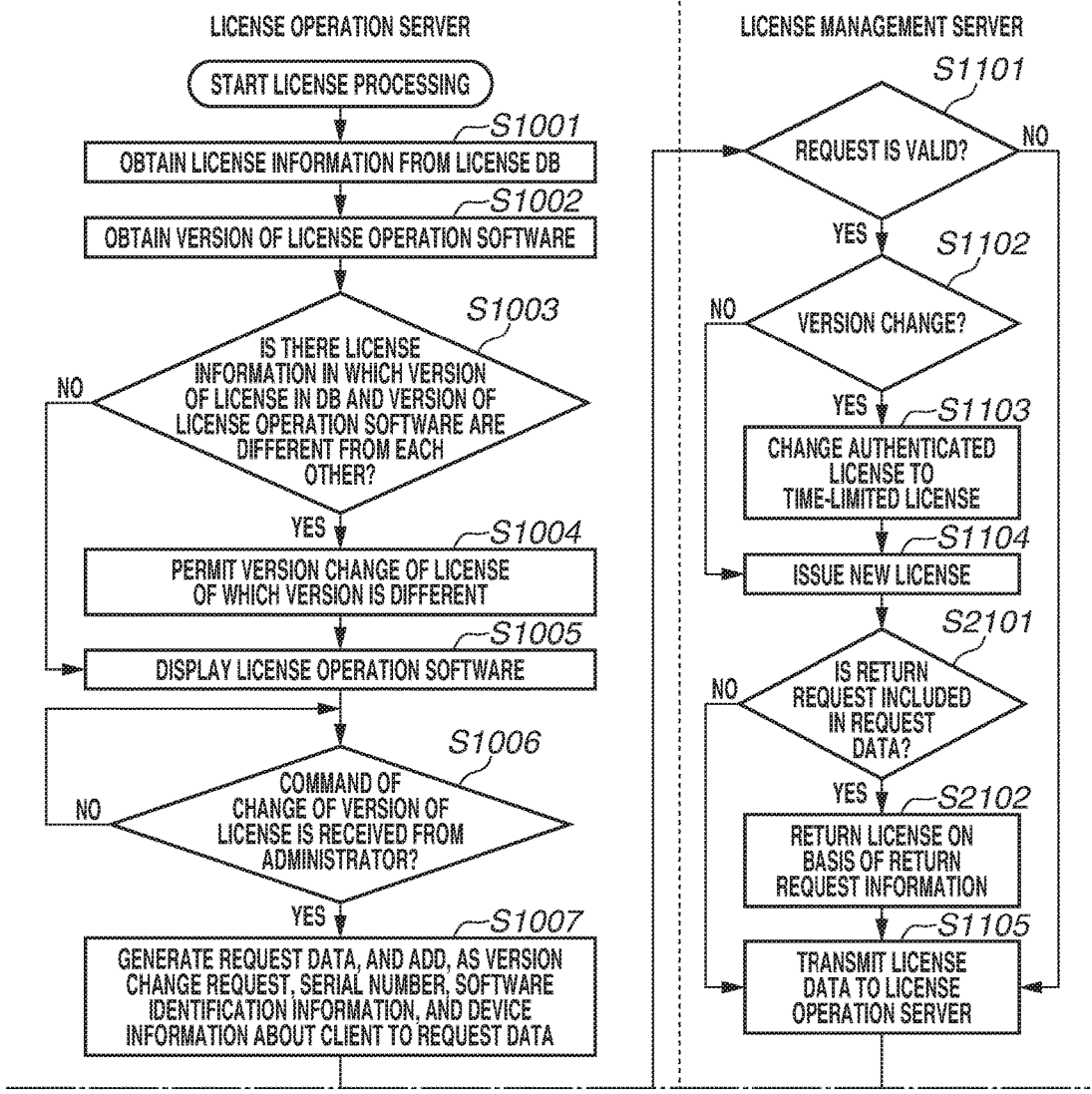
FIG. 8, composed of FIG. 8A and FIG. 8B, is a processing flowchart of a second exemplary embodiment.
Figure 8B:
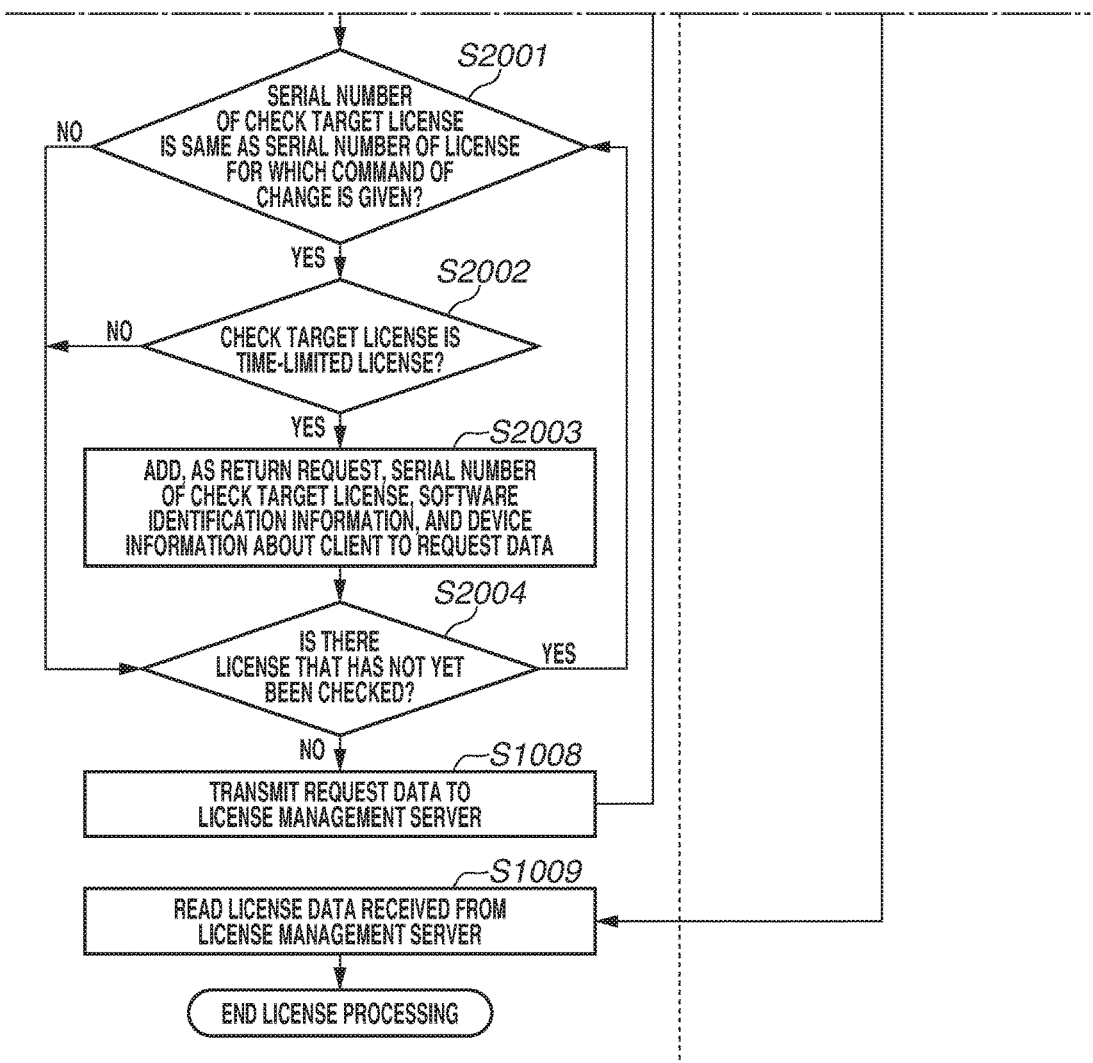

FIG. 8, composed of FIGS. 8A and 8B, is a flowchart of processing executed by a license operation server 120 and a license management server 130 according to the second exemplary embodiment. In FIG. 8, portions overlapping FIG. 7 will not be described again.

Processing in the license operation server 120 will be described. The processing in step S1001 to step S1007 are similar to those in FIG. 7.

In step S2001 in FIG. 8A, the license management module 312 adopts, as a check target, a single piece of license information from a list of license information obtained in step S1001. Then, a determination is made as to whether the serial number included in the license information is the same serial number as the license for which the version change command is received. In a case where the serial number included in the license information is the same serial number as the license for which the version change command is received (Yes in step S2001), the processing proceeds to step S2002. In a case where the serial number included in the license information not the same serial number as the license for which the version change command is received (No in step S2001), the processing proceeds to step S2004.

In step S2002, the license management module 312 determines whether the license information about the check target has an expiration date. In a case where the license information has an expiration date (Yes in step S2002), the processing proceeds to step S2003. In a case where the license information does not have an expiration date (No in step S2002), the processing proceeds to step S2004.

In step S2003, the license management module 312 adds the license information about the check target to the request data generated in step 31007 as a return target license. This request data includes, as information about the return target license, a serial number, identification information (return target version) about the software, the quantity of the licenses, and the device information about the license operation server 120.

In step S2004, the license management module 312 determines whether there is license information that has not yet been checked in the list of license information. In a case where there is license information that has not yet been checked (Yes in step S2004), the processing proceeds to step S2001. In a case where all the license information has been checked (No in step S2004), the processing proceeds to step S1008, and the request data is transmitted to the license management server 130.

Subsequently, processing in the license management server 130 will be described. The processing in step S1101 to step S1104 are similar to those in FIG. 7.

In step S2101, the license management software 321 determines whether the received request data includes a return request for a return target license. In a case where the received request data includes a return request (Yes in step S2101), the processing proceeds to step S2102. In a case where the received request data does not include a return request (No in step S2101), the processing proceeds to step S1105.

In step S2102, the license management software 321 executes return processing for target license included in the request data, and updates the license table 600. More specifically, the return target license is erased from the license table 600. Thereafter, in step S1105, the license management software 321 transmits all the licenses associated with the device information of the license operation server 120 in the license table 600 to the license operation server 120 as the license data. As a result, in step S1009, the return target license is erased from the license table 500 as the license management module 312 of the license operation server overwrites and saves the received license data to the license saving unit 313.

As described above, even if the license version change is repeated multiple times, multiple licenses having expiration dates are not saved. As a result, only the indefinite license after the version update and the license having the expiration date for the immediately-before version remain.

In the above second exemplary embodiment, the license of the version which is to be returned is identified in the processing from step S2001 to step S2004 performed by the license operation server 120, but the second exemplary embodiment may be configured so that the processing for identifying the license of the version, which is to be returned, is performed by the license management server 130. In this case, a notification may be given to the license operation server 120 to forcibly return the license of the version identified as the return target.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016369, filed Jan. 29, 2016, which is hereby incorporated by reference herein in its entirety.

What is claimed is:

1. A license management server comprising:
at least a processor and at least a memory coupled to the at least the processor and having stored thereon instructions, when executed by the at least the processor, and cooperating to act as:
　a receiving unit configured to receive a request for upgrading a first license to a second license from a license operation server that leases a license to a client;
　an issuing unit configured to, in a case where the license upgrade request is received, change an expiration date of the first license from indefinite to a predetermined expiration date and issue the second license whose expiration date is indefinite; and
　a transmitting unit configured to transmit the first license whose expiration date is the predetermined expiration date and the second license whose expiration date is indefinite,
wherein, in a case where the receiving unit receives a request for downgrading the second license to the first license from the license operation server,
the issuing unit changes the expiration date of the second license from indefinite to a predetermined expiration date and issues the first license whose expiration date is indefinite,
　upon receiving the license upgrade request, the issuing unit deletes the first license whose expiration date has been changed to the predetermined expiration date, and
　upon receiving the license downgrade request, the transmitting unit transmits the second license whose expiration date is the predetermined expiration date and the first license whose expiration date is indefinite to the license operation server.

2. The license management server according to claim 1, wherein a serial number of the second license whose expiration date is indefinite issued by the issuing unit is the same as a serial number of the first license whose expiration date is the predetermined expiration date.

3. The license management server according to claim 1, wherein the expiration date of the second license issued by the issuing unit is indefinite.

4. The license management server according to claim 1, further comprising a license managing unit configured to manage information about the first license whose expiration date is the predetermined expiration date and the second license whose expiration date is indefinite in association with the license operation server.

5. A license management system including a license operation server configured to lease a license to a client, and a license management server configured to issue license to the license operation server,
　wherein the license operation server comprises:
　　a saving unit configured to hold a first license required when the client executes software of the first version;
　　a usage managing unit configured to lease the first license to the client according to a request from the client;
　　a first receiving unit configured to receive a change command for upgrading the first license held by the saving unit to a second license;
　　a first transmitting unit configured to transmit, to the license management server, a request for upgrading the first license to the second license in a case where the first receiving unit receives the change command; and
　　an updating unit configured to update a license held in the saving unit using a license transmitted from the license management server according to the request, and
　wherein the license management server comprises:
　　an issuing unit configured to, in a case where the license upgrade request is received, change an expiration date of the first license from indefinite to a predetermined expiration date and issue the second license whose expiration date is indefinite; and
　　a second transmitting unit configured to transmit, the first license whose expiration date is predetermined expiration date and the second license whose expiration date is indefinite to the license operation server,
　　wherein, in a case where the first receiving unit receives a request for downgrading the second license to the first license from the license operation server, the issuing unit changes the expiration date of the second license from indefinite to a predetermined expiration date and issues the first license whose expiration date is indefinite, upon receiving the license upgrade request, the issuing unit deletes the first license whose expiration date has been changed to the predetermined expiration date, and upon receiving the license downgrade request, the transmitting unit transmits the second license whose expiration date is the predetermined expiration date and the first license whose expiration date is indefinite to the license operation server.

6. The license management system according to claim 5, wherein the license operation server further comprises:

a determining unit configured to determine whether there is a license to be returned according to the change command; and a returning unit configured to transmit a return request of a license determined to be returned by the determining unit, and wherein the license management server further comprises an erasing unit configured to erase, based on the return request, the license determined to be returned.

7. The license management system according to claim 5, wherein a serial number of the second license whose expiration date is indefinite issued by the issuing unit is the same as a serial number of the first license whose expiration date is the predetermined expiration date.

8. The license management system according to claim 5, wherein the expiration date of the second license issued by the issuing unit is indefinite.

9. The license management system according to claim 5, further comprising a license managing unit configured to manage information about the first license whose expiration date is the predetermined expiration date and the second license whose expiration date is indefinite in association with the license operation server.

10. A non-transitory computer-readable storage medium storing instructions that, when executed by a processor, cause the processor to perform operations comprising:

receiving a request for upgrading a first license to a second license from a license operation server that leases a license to a client;

issuing, in a case where the license upgrade request is received, change an expiration date of the first license from indefinite to a predetermined expiration date and issue the second license whose expiration date is indefinite; and transmitting, the first license whose expiration date is the predetermined expiration date and the second license whose expiration date is indefinite to the license operation server, wherein, in a case where the a request for downgrading the second license to the first license is received from the license operation server, changing the expiration date of the second license from indefinite to a predetermined expiration date and issuing the first license whose expiration date is indefinite, upon receiving the license upgrade request, deleting the first license whose expiration date has been changed to the predetermined expiration date, and upon receiving the license downgrade request, the transmitting the second license whose expiration date is the predetermined expiration date and the first license whose expiration date is indefinite to the license operation server.

11. The non-transitory computer-readable storage medium according to claim 10, wherein a serial number of the issued second license whose expiration date is indefinite is the same as the serial number of the first license whose expiration date is indefinite.

12. The non-transitory computer-readable storage medium according to claim 10, wherein the expiration date of the issued second license is indefinite.

13. The non-transitory computer-readable storage medium according to claim 10, wherein the operations further comprises managing information about the first license whose expiration date is predetermined expiration date and the second license whose expiration date is indefinite in association with the license operation server.

* * * * *